Figure 1A:
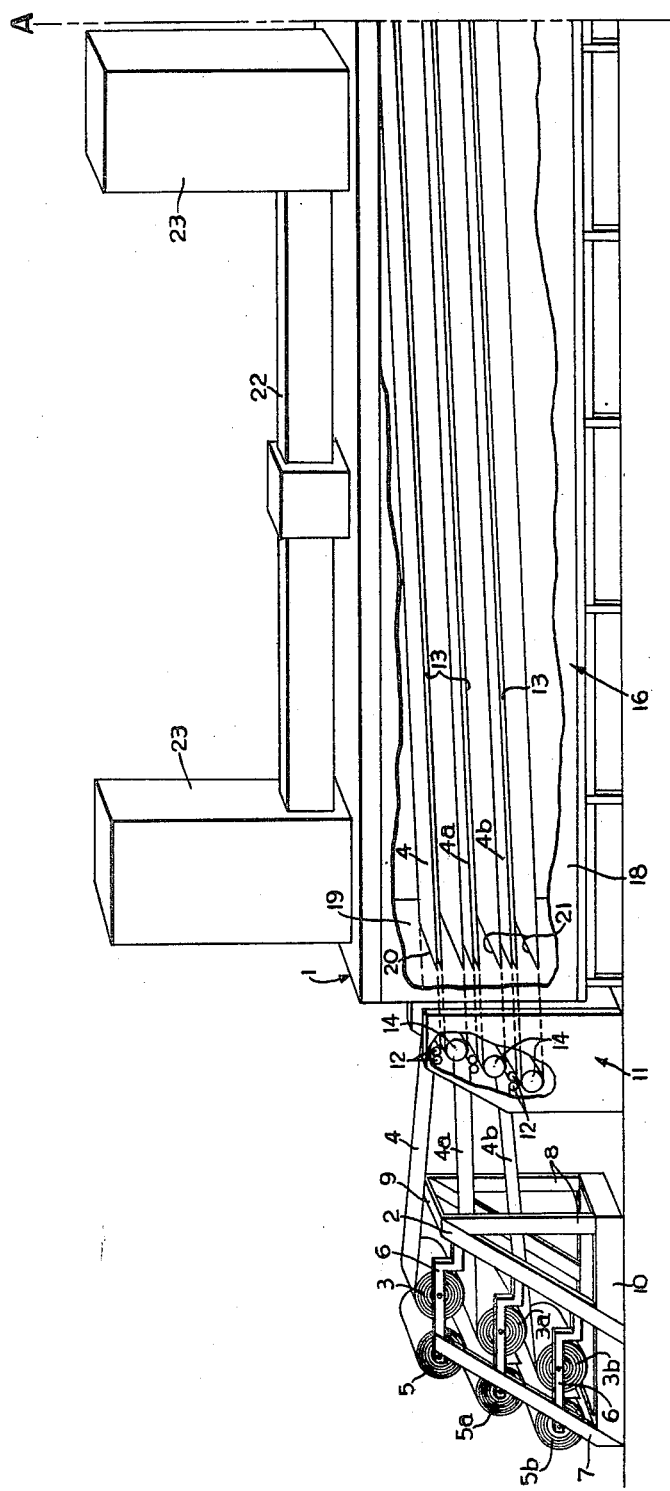

Oct. 5, 1954  A. GOULDING, JR., ET AL  2,690,590
METHOD OF AND APPARATUS FOR MANUFACTURING
THERMOPLASTIC FLOOR COVERING MATERIAL
Filed July 6, 1951  3 Sheets-Sheet 1

INVENTOR.
ALBERT GOULDING, JR.
BY MICHAEL JUKICH

R. L. Miller
ATTORNEY

Oct. 5, 1954  A. GOULDING, JR., ET AL  2,690,590
METHOD OF AND APPARATUS FOR MANUFACTURING
THERMOPLASTIC FLOOR COVERING MATERIAL
Filed July 6, 1951  3 Sheets-Sheet 2

INVENTOR.
ALBERT GOULDING, JR.
MICHAEL JUKICH

BY
P. L. Miller
ATTORNEY

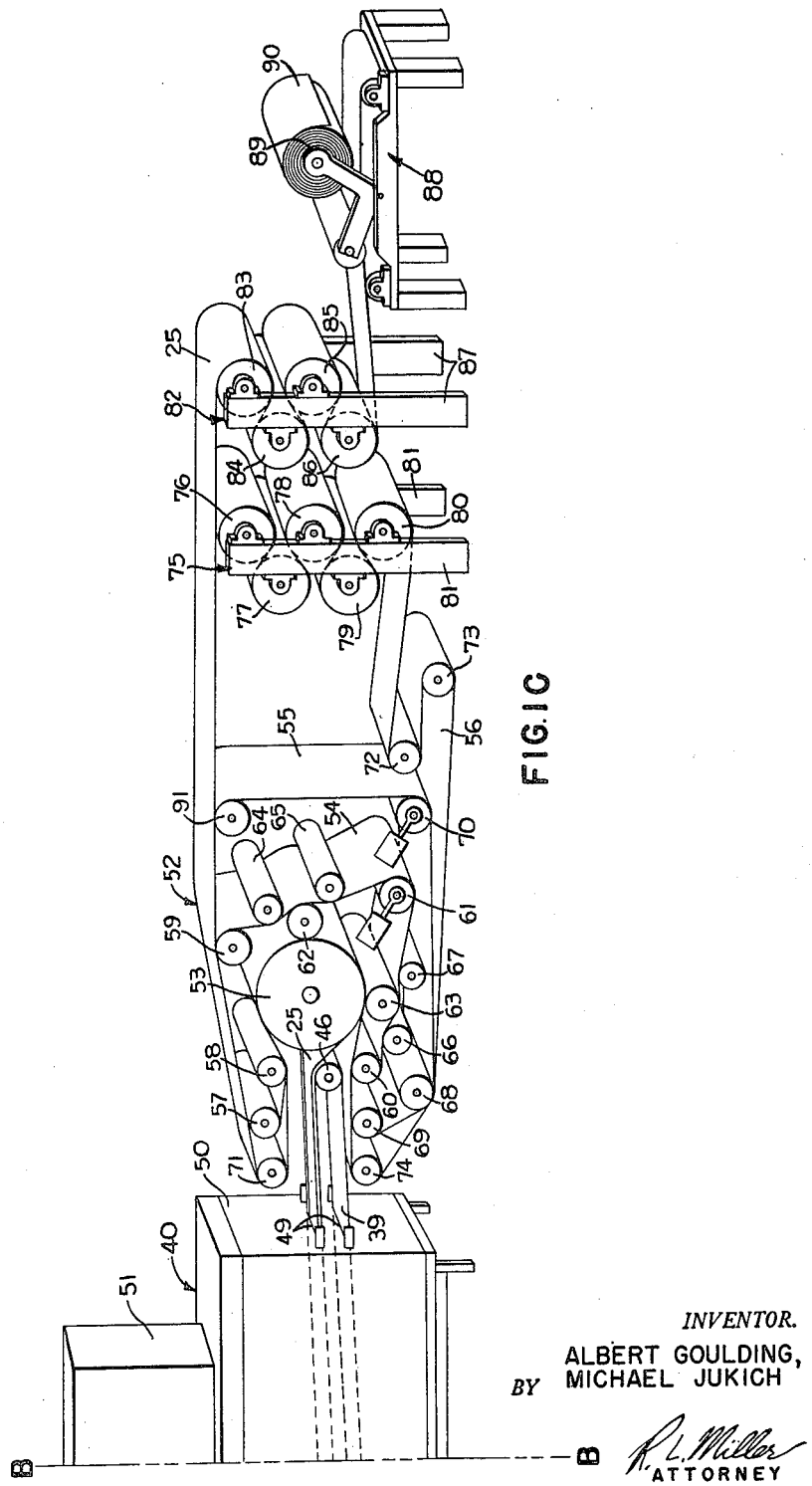

Patented Oct. 5, 1954

2,690,590

UNITED STATES PATENT OFFICE 2,690,590

METHOD OF AND APPARATUS FOR MANUFACTURING THERMOPLASTIC FLOOR COVERING MATERIAL

Albert Goulding, Jr., Cuyahoga Falls, and Michael Jukich, Akron, Ohio, assignors, by mesne assignments, to The Goodyear Tire & Rubber Company, a corporation of Ohio Application July 6, 1951, Serial No. 235,476

13 Claims. (Cl. 18—4)

1

The present invention relates to an improved method and apparatus for the manufacture of thermoplastic floor covering material and the like embodying a plurality of superposed laminae of substantially continuous lengths. More particularly, the invention is concerned with the manipulation and treatment of a plurality of strips or sheets of thermoplastic material and the fabrication from such strips of a laminate such, for example, as floor and wall coverings and other similar products.

The manufacture of thermoplastic material in the form of sheets or strips representing the individual laminae forming the plies of the finished product is customarily accomplished by subjecting a mass of the material concomitantly to the action of heat and pressure. Typical processes employed in the shaping of such material are calendering or extruding processes wherein the use of heat renders the material plastic and the application of pressure completes the shaping of the product. This working or kneading of the thermoplastic material invariably introduces in the sheets or strips resulting from the forming step certain stresses and strains which, if not relieved, will eventually be translated into certain detrimental effects in the finished products.

In the manufacture of products from a number of plies of thermoplastic material of substantially continuous lengths, it is essential to take steps to properly relieve the aforementioned stresses and strains induced in the material by the forming operation in order to prevent the subsequent shrinkage and dimensional instability of the finished product. Unless these stresses and strains incident to the manufacture of individual strips or sheets of thermoplastic material are removed before they are put to use, serious and unpredictable shrinkages will occur slowly at room temperatures and more rapidly at elevated temperatures. This dimensional instability or non-uniformity in the finished product makes it imperative that timely steps be taken to remove these detrimental effects and it is the purpose of the present invention to accomplish this result among other things.

Many thermoplastic materials formed by a calendering or extruding operation also tend to develop minute surface blemishes which impair the appearance and affect the saleability of the product. It has been found that such common surface defects as small air or gas bubbles, hair cracks, and minor scratches can be readily removed if the material is permitted to relax freely with the application of heat at temperatures in the range of 300 to 400 degrees F. followed by the application of uniform pressure to the material while it is in contact with a smooth, heated metal surface.

Moreover, the process and apparatus of the present invention facilitates the production of a hard, highly polished, wear and mar resistant surface to the one side of the thermoplastic material and a somewhat roughened surface to the other side thereof to facilitate the application and adherence of various adhesives. It is also readily possible in accordance with the teaching of the present invention to apply one or more plies of thermoplastic material to a different base material such, for example, as other forms of plastic, fabrics, felting, padding, and the like.

It is thus an object of the present invention to provide a process and apparatus which will facilitate the production of high quality products from sheets or strips of thermoplastic material formed by the coincident application of pressure and heat to the material.

It is a further object of the present invention to provide an economical method and apparatus for the manufacture of calendered and/or extruded thermoplastic sheet material into a multiple-ply laminate of predetermined width and gauge and of substantially continuous lengths.

Another object of the invention is the provision of a method and apparatus for treating thermoplastic material in the form of individual strips of substantially continuous lengths to relieve the stresses and strains induced in the individual plis of the material during the manufacture thereof and thereafter to assemble a number of the treated strips into a multiple-ply product having good dimensional stability.

It is to be understood that the process and apparatus of the present invention are particularly adapted to the production and treatment of thermoplastic material of the type prepared either by a calendering operation or by an extrusion process embodying the coincident application of heat and pressure to the material as opposed to that class of thermoplastic material produced by a casting operation. The stresses and strains induced by the calendering or extruding of such material in the course of their manufacture are not found to be present in products cast from solutions.

As examples of the thermoplastic material to the manufacture of which the process and apparatus of the present invention are most advantageously applied are those organic polymerization products such as vinyl chloride, styrene, polyethylene, acrylic nitrile, acrylic or methacrylic esters, or polymerization products of mixtures of the aforementioned compounds with each other or with other compounds polymerizable under the same conditions as well as their conversion products. The process is of particular significance in the manufacture and treatment of polymerization products of vinyl chloride, including vinyl chloride alone or copolymers of vinyl chloride and other polymerizable substances. It will be readily understood that the addition of certain softening agents, pigments, dye stuffs, or common stabilizing agents may be made to the substances without materially affecting their reaction to the procedure employed in the present invention.

Figure 1B:
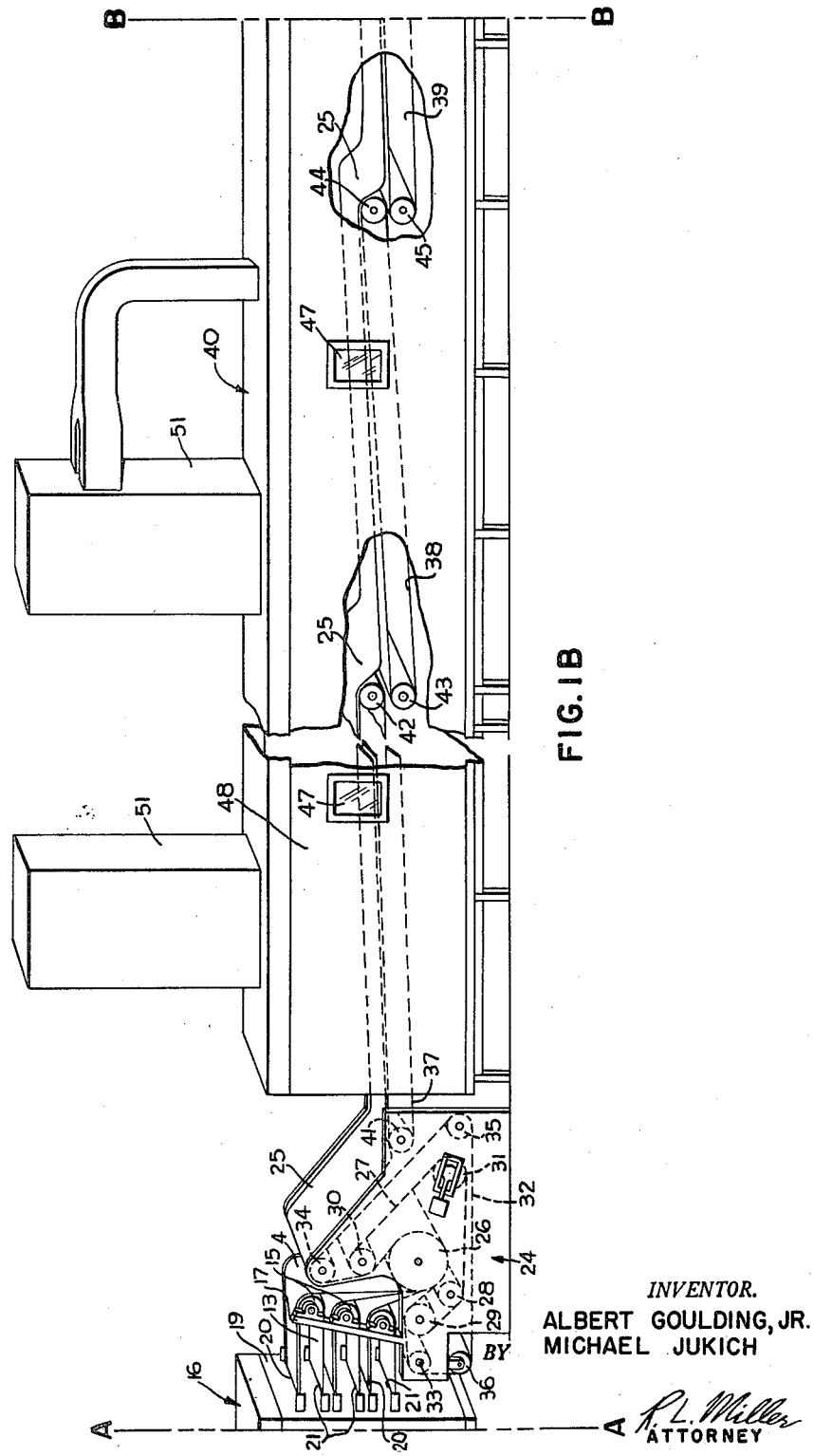

In the drawings, Figures 1A, 1B and 1C represent a diagrammatic showing of an advantageous form of apparatus for carrying out the process of the invention as applied to the manufacture and treatment of thermoplastic material.

In the drawings, the reference numeral 1 identifies generally the apparatus for manufacturing floor covering material. It will be apparent from the detailed description of the unit 1 that it embodies several elements each of which performs a particular function in the manufacture of the floor covering material.

In the unit 1, a supply or left-off mechanism 2 carries a plurality of supply packages 3, 3a, 3b from each of which a single substantially continuous sheet or lamina 4, 4a, 4b of thermoplastic material is withdrawn. The supply packages 3, 3a, 3b supplying the laminae 4, 4a, 4b as well as the auxiliary supply packages 5, 5a, 5b are freely rotatably mounted upon the transverse rails 6 supported by the several upright members 7 and 8 and transverse member 9 comprising the framework supported by the base 10. As the supply of the material 4, 4a, or 4b on the packages 3, 3a, or 3b becomes depleted in the normal course of operation of the unit 1, the auxiliary packages 5, 5a, or 5b take the position originally occupied by the packages 3, 3a, or 3b and a new group of auxiliary packages 5, 5a, 5b will be supplied.

The several laminae 4, 4a, 4b are threaded into the withdrawing means 11 in which are disposed the several sets of driven nip rolls 12, one for each lamina. The rolls 12 serve to withdraw the several laminae 4, 4a, 4b from the supply rolls 3, 3a, 3b at a predetermined substantially constant rate and lay them on the endless conveyor belts 13 which pass over and are supported and driven by the pulleys 14 and 15 at the extreme opposite ends of the heating chamber or laminating oven 16. The several pulleys 14 are arranged to be positively driven in the withdrawing means 11 by a conventional drive (not shown). The idler pulleys 15 are freely rotatably mounted in the uprights 17.

The several belts 13 are arranged in spaced mutually parallel relation to each other inside the enclosure 18 of the heating chamber 16. The belts 13 are carried on a slight inclination as they pass from one to the other of the end walls 19 of the enclosure 18 wherein shielded openings 20 and 21 are provided for the belt with the laminae 4, 4a, or 4b thereon to pass in and out of the heating chamber 16 and around the pulleys 14 and 15. The belts 13 are preferably of chain link construction having open mesh to permit the heat in the heating chamber 16 to produce a substantially uniform effect on both surfaces of the laminae 4, 4a, 4b.

The heating chamber 16 is supplied with heat by any of several different heating media of conventional types (not shown). Optimum conditions in the heating chamber 16 are achieved when the temperature of each of the several laminae 4, 4a, 4b has been uniformly raised to 300° F. after an exposure of one minute. To insure this achievement, the temperature of the heating chamber 16 is controllable from 220° to 350° F. Suitable ducts 22 and 23 serve to circulate the air and remove gases from the heating chamber 16 during the course of operation of the unit 1.

As the tacky laminae 4, 4a, 4b emerge from the heating chamber 16 through the shielded openings 20 in the end wall 19 thereof, they are removed from the respective belts 13 and fed into the bite of the laminating means or machine 24 where continuous pressure is applied to bond the several laminae into a single composite strip or laminate 25. The machine 24 comprises a heated drum 26 of relatively large diameter about the major portion of the outer periphery of which an endless belt 27 is maintained in contact. The axial dimension of the drum 26 and the transverse cross sectional dimension of the belt 27 are preferably somewhat greater than the width of the laminate 25.

The belt 27 is maintained in contact with the periphery of the drum 26 through the aid of the several rolls 28, 29, 30 and the jack or adjustable roll 31, the axis of the latter being shiftable to adjust the tension on the belt 27 and the pressure applied to the drum 26. In order to protect the tension belt 27, a similar endless belt 32, referred to generally as an "apron belt," is arranged to encompass the travel of the belt 27. The apron belt 32 is supported by rolls 33, 34, 35, and the adjustable roll 36 as well as in part by the rolls 29 and 30. Thus, the apron belt 32 actually contacts the laminae 4, 4a, 4b and the periphery of the drum 26 although the actual pressure is applied to the several laminae through the agency of the belt 27.

The several laminae 4, 4a, 4b thus enter the bite between the belts 27 and 32 and the drum 26 where the heat and pressure exerted simultaneously thereon serve to produce an autogenous bond between the several laminae. For the purpose of retaining the necessary heat in the several laminae 4, 4a, 4b to produce the desired bond, the drum 26 is carefully maintained at a temperature of approximately 250° F. The machine 24 is operated in the proper timed relation to correspond substantially with the rate of discharge of the heat softened laminae 4, 4a, 4b from the heating chamber 16. Ordinarily, the drum 26 will be driven although any one or more of the rolls 28, 29, or 30 may be driven.

The laminate 25 formed by the machine 24 is now delivered to the first of a series of endless conveyor belts 37, 38, 39 arranged in sequential relation and disposed interiorly of the heating or annealing chamber 40. The belt 37 is supported by the pulleys 41 and 42, one of which is driven by any conventional form of drive (not shown) at a rate slightly less than that of the discharge of the laminate 25 from the machine 24. Similarly, the belts 38 and 39 are supported by the pulleys 43, 44, and 45, 46 respectively. The drives (not shown) for the belts 38 and 39 are each progressively slightly slower than that of the preceding belt. This differential drive arrangement enables the laminate 25 to relax completely during the course of its travel through the annealing oven 40.

A heating medium is supplied to the annealing oven 40 by a suitably controlled heating means (not shown) to provide a temperature range of 300° to 400° F. In order to produce a satisfactory product and to maintain optimum conditions, the temperature of the laminate 25 should be raised from 200° to 350° F. in an interval of two minutes to remove the shrinkage tendency induced in the material.

Inspection ports 47 are arranged in the walls 48 of the annealing oven 40 at intervals along the length of the unit. The belt 37 extends beyond the end wall of the annealing oven 40 adjacent the laminating machine 24 to receive the laminate 25 as it emerges therefrom. Similarly, the belt 39 extends through shielded openings 49 in the end wall 50 of the annealing oven 40. The annealed laminate 25 leaves the belt 39 and passes into the bite of the polishing means or finishing unit 52.

The several conduits or ducts 51 in the annealing oven 40 serve to insure proper circulation of the heating medium and the removal of vapors and gases escaping from the laminate 25 during the annealing operation. All detrimental stresses and strains induced in the individual laminae 4, 4a, 4b in the course of their production and preparation, as well as any similar imperfections created in the laminate 25 which cause shrinkage and other irregularities in the finished product, are readily removed by the annealing step. This is accomplished by supporting the finished laminate 25 in completely relaxed and unstressed condition while it is subjected to relatively high heat.

Next, the laminate 25 is subjected to a gradual reduction in temperature in the finishing unit 52 embodying the large diameter drum 53 and the pressure bands or tension belts 54 and 55 and the blanket or apron belt 56. The drum 53 is internally heated to a temperature of approximately 250° F. and is driven by any suitable power source (not shown). The finishing unit 52 is generally similar to the laminating machine 24 except that the drum 53 is larger than the drum 26 and an extra belt is employed in the former.

The belt 54 is supported by the pulleys 57, 58, 59, and 60 and the adjustable jack pulley 61 which serves to tension the belt and increase the degree of pressure with which it is in contact with the drum 53. As a means of further increase in the pressure applied to the drum 53 and to the laminate 25 as it passes therearound, a pair of pressure rolls 62 and 63 are provided. The pressure exerted by the pressure rolls 62 and 63 is controlled by the use of the jack pulleys 64, 65 and 66, 67 respectively, which bear against the portion of the pass of the belt 54 not in contact with the drum and force it against the pressure rolls 62 and 63.

The belt 55 is supported by the freely rotatable pulleys 91, 68, and 69 and the jack pulley 70 as well as the pulleys 57, 58, 59, and 60 for the belt 54. The pressure rolls 62 and 63 also serve to apply additional pressure on that portion of the belt 55 which passes about the drum 53. As before, the adjustment of the position of the axis of the jack pulley 70 will serve to regulate the amount of tension in the belt 55 and determine the degree of pressure applied to the periphery of the drum 53.

The blanket or apron belt 56 is passed over pulleys 71, 72, 73, and 74, but is additionally supported or contacted by pulleys 57, 58, 59, 91, 68, 69, and 60. The apron belt 56 serves to protect the more expensively constructed belts 54 and 55, and in order to add somewhat to its life span, it is subjected to a cooling operation since it becomes extremely hot due to its direct contact with the laminate 25 which is being treated. The cooling of the apron belt 56 is accomplished by passing a portion of the belt over the cooling means 75 comprising the several cooling drums 76, 77, 78, 79, and 80 supported by the uprights 81. Cold water is circulated through the several drums to produce the desired cooling effect.

The periphery of the drum 53 with which the laminate 25 comes into contact in its passage through the finishing unit 52 is matted to produce the desired smoothly polished finish to that surface of the laminate in contact therewith. The opposite surface of the laminate 25 comes into contact with the apron belt 56 which, under the pressure exerted on the belt and the laminate in contact therewith, produces a roughened or woven textured effect or finish which is desired for the under surface of the material to which the adhesive is applied in the course of the laying operation. The roughened surface enables the adhesive to produce a better bond when the laminate 25 is affixed to a floor, wall, shelf, drainboard, and the like.

Adjacent the point where the apron belt 56 is diverted over the cooling drums 76, 77, 78, 79, and 80 of the cooling means 75, the laminate 25 is passed over a series of similar cooling means 82 embodying the drums 83, 84, 85, and 86 supported by the stand 87 to lower the temperature of the finished laminate to approximately room temperature. The finished laminate 25 is then directed to a collecting means or wind-up mechanism 88 where it is wound upon a roll 89 in the form of a package 90.

Various additional steps, such, for example, as inspection and trimming of the laminate 25, may advantageously be performed between the cooling means 82 and the wind-up mechanism 88.

While certain representative embodiments and details have been shown for the purpose of illustrating the invention, it will be apparent to those skilled in this art that various changes and modifications may be made therein without departing from the spirit or scope of the invention.

We claim:

1. The method of manufacturing a thermoplastic floor covering material embodying a plurality of superposed laminae each of which possesses a residual tendency to shrink when subjected to heat and pressure, said method comprising the steps of subjecting the several laminae simultaneously to heat while supporting each lamina independently of the others to render the exposed surfaces thereof tacky; plying up the several laminae one upon the other and simultaneously applying pressure to the resulting laminate; subjecting the laminate to heat while supporting it in a freely relaxed condition; smoothing and polishing one of the exposed surfaces of the laminate; cooling the laminate; and collecting the laminate in the form of a package.

2. The method of manufacturing a thermoplastic floor covering material embodying a plurality of superposed laminae each of which possesses a residual tendency to shrink when subjected to heat and pressure, said method comprising the steps of subjecting the several laminae simultaneously to heat while supporting each lamina independently of the others to render the exposed surfaces thereof tacky; assembling the several laminae in superposed relation; applying pressure to the superposed laminae whereby an autogenous bond is created therebetween to form a laminate; subjecting the laminate to heat while supporting it in a freely relaxed condition; smoothing and polishing one of the exposed surfaces of the laminate; cooling the laminate; and collecting the laminate in the form of a package.

3. The method of manufacturing a thermoplastic floor covering material embodying a plurality of superposed laminae each of which possesses a residual tendency to shrink when subjected to heat and pressure, said method comprising the steps of subjecting the several laminae simultaneously to heat at temperatures ranging from 220° to 350° F. for a time interval of from one-half to one and one-half minutes while supporting each lamina independently of the others to render the exposed surfaces thereof tacky; plying up the several laminae one upon the other and simultaneously applying pressure to the resulting laminate; subjecting the laminate to heat at temperatures ranging from 300° to 400° F. for a time interval of from one to three minutes while supporting it in a freely relaxed condition; smoothing and polishing one of the exposed surfaces of the laminate; cooling the laminate; and collecting the laminate in the form of a package.

4. The method of manufacturing a thermoplastic floor covering material embodying a plurality of superposed laminae each of which possesses a residual tendency to shrink when subjected to heat and pressure, said method comprising the steps of subjecting the several laminae simultaneously to heat such that the laminae will have a temperature of approximately 300° F. after a one minute interval while supporting each lamina independently of the others to render the exposed surfaces thereof tacky; assembling the several laminae in superposed relation; applying pressure to the superposed laminae whereby an autogenous bond is created therebetween to form a laminate; subjecting the laminate to heat such that the laminate will have a temperature of approximately 200° to 350° F. after a two minute interval to remove all of the inherent tendency to shrink while supporting it in a freely relaxed condition; smoothing and polishing one of the exposed surfaces of the laminate; cooling the laminate; and collecting the laminate in the form of a package.

5. The method of manufacturing a thermoplastic floor covering material embodying a plurality of superposed laminae each of which possesses a residual tendency to shrink when subjected to heat and pressure, said method comprising the steps of subjecting the several laminae simultaneously to heat while supporting each lamina independently of the others to render the exposed surfaces thereof tacky; plying up the several laminae one upon the other and simultaneously applying pressure to the resulting laminate while maintaining the temperature of the individual laminae; subjecting the laminate to heat while supporting it in a freely relaxed condition; smoothing and polishing one of the exposed surfaces of the laminate while maintaining the temperature of the laminate substantially constant; cooling the laminate; and collecting the laminate in the form of a package.

6. Apparatus for the manufacture of a thermoplastic floor covering material embodying a plurality of superposed laminae each of which possesses a residual tendency to shrink when subjected to heat and pressure, said apparatus comprising a let-off supplying a plurality of laminae of substantially continuous lengths; means withdrawing the laminae from the let-off at a substantially constant rate; a first heating chamber; means in the heating chamber supporting each of the laminae in spaced relation to each other; means receiving the laminae as they emerge from the heating chamber and plying them one upon the other; means applying pressure to the plied laminae to bond them together in the form of a laminate; a second heating chamber; means in said second heating chamber for supporting the laminate in freely relaxed condition; a finishing unit receiving the laminate emerging from the second heating chamber and applying additional pressure thereto for polishing one of the surfaces thereof; means for cooling the finished laminate; and means collecting the laminate in the form of a package.

7. Apparatus for the manufacture of a thermoplastic floor covering material embodying a plurality of superposed laminae each of which possesses a residual tendency to shrink when subjected to heat and pressure, said apparatus comprising a let-off supplying a plurality of laminae of substantially continuous lengths; a device for withdrawing each laminae from the let-off at a constant rate; a heating chamber; a conveyor element in said heating chamber for each lamina, said conveyor elements being arranged in mutually spaced relation and being driven at a rate corresponding to the withdrawing device; a laminating machine for plying up the several laminae and applying pressure to the plied laminae to bond them together as a laminate while maintaining heat thereon; an annealing oven; a series of differentially driven conveyor elements in the annealing oven for supporting the laminate in freely relaxed condition; a finishing unit applying additional heat and pressure to the laminate; cooling drums for reducing the temperature of the laminate; and means collecting the finished laminate in the form of a package.

8. Apparatus for the manufacture of a thermoplastic floor covering material embodying a plurality of superposed laminae each of which possesses a residual tendency to shrink when subjected to heat and pressure, said apparatus comprising a let-off supplying a plurality of laminae of substantially continuous lengths; a device for withdrawing each lamina from the let-off at a constant rate; a heating chamber; a plurality of conveyor elements arranged in spaced, generally parallel relation to each other in the heating chamber operating at substantially the same rate as the withdrawing device; a laminating machine embodying a heated drum and a pressure band; an annealing oven; a series of successively arranged differentially driven conveyor elements in said oven; a finishing machine generally similar to the laminating machine; a series of cooling drums; and a collecting device.

9. Apparatus for the manufacture of a thermoplastic floor covering material embodying a plurality of superposed laminae each of which possesses a residual tendency to shrink when subjected to heat and pressure, said apparatus comprising a let-off supplying a plurality of laminae of substantially continuous lengths; a device for withdrawing each lamina from the let-off at a constant rate; a heating chamber having disposed therein a number of conveyor elements corresponding to the number of laminae being withdrawn from the let-off, said conveyor elements being arranged in mutually parallel relation to each other and driven at substantially the same rate as the withdrawing device; a laminating machine embodying a heated drum and a pressure band in contact with a major portion of the periphery of the drum; an annealing oven having disposed therein a number of successively arranged conveyor elements, said conveyor elements being differentially driven with the last slower than the first; a finishing unit generally similar to the laminating machine; a series of cooling drums; and a collecting device.

10. Apparatus for the manufacture of a thermoplastic floor covering material embodying a plurality of superposed laminae each of which possesses a residual tendency to shrink when subjected to heat and pressure, said apparatus comprising a let-off accommodating a plurality of rolls each supplying a single lamina of substantially continuous length; a withdrawing device for each lamina from its roll; a heating chamber having disposed therein a number of conveyor elements corresponding to the number of laminae, said conveyor elements being disposed in spaced mutually parallel relation and driven at substantially the same rate as the withdrawing devices and subjecting the laminae to heat; a laminating machine receiving the several laminae discharged from the heating chamber and superposing them upon each other to form a laminate, said machine embodying a heated drum and a pressure band arranged to apply heat and pressure to the superposed laminae to bond them together; an annealing oven having disposed therein a plurality of sequentially arranged conveyor elements supporting the laminate and subjecting the same to heat, said conveyor elements being differentially driven at a successively decreasing rate for supporting the laminate in relaxed condition; a finishing machine receiving the annealed laminate and applying a smooth gloss finish on one surface thereof, said machine embodying a heated drum and a pressure band augmented by a plurality of pressure rolls for applying heat and pressure to the laminate as it passes therebetween; a series of cooling drums; and a wind-up for collecting the finished laminate in the form of a package.

11. The method of manufacturing a thermoplastic floor covering material embodying a plurality of superposed laminae each of which possesses a residual tendency to shrink when subjected to heat and pressure, said method comprising the steps of moving the laminae through substantially parallel but spaced paths, uniformly heating the several laminae simultaneously while separate from each other to make their exposed surfaces tacky, bringing the laminae into superimposed relation and applying pressure to secure the laminae into a unitary body, heating the laminae unit while untensioned to permit contraction thereof, smoothing and polishing one surface of the laminae unit, and cooling the laminae unit.

12. The method of manufacturing a thermoplastic floor covering material embodying a plurality of superposed laminae each of which possesses a residual tendency to shrink after having been subjected to heat and pressure, said method comprising the steps of moving the laminae through substantially parallel paths, uniformly heating the several laminae while separate from each other, superimposing the laminae and applying heat and pressure to secure the laminae into a unitary body, removing all tension and pressure on the laminae unit and heating it to permit contraction thereof, and cooling the laminae unit.

13. The method of manufacturing a thermoplastic floor covering material embodying a plurality of superposed laminae each of which possesses a residual tendency to shrink when subjected to heat and pressure, said method comprising the steps of heating the several laminae simultaneously while separate from each other, bringing the laminae into superimposed relation and applying pressure to secure the laminae into a unitary body, removing all tension and pressure on the laminae unit and heating it to permit contraction and annealing thereof, and cooling the laminae unit.

References Cited in the file of this patent

UNITED STATES PATENTS

| Number | Name | Date |
|---|---|---|
| 1,361,970 | Dickey | Dec. 14, 1920 |
| 2,135,763 | Nicholson | Nov. 8, 1938 |
| 2,239,780 | Fikentscher et al. | Apr. 29, 1941 |
| 2,279,112 | Drake et al. | Apr. 7, 1942 |
| 2,317,409 | Seaton | Apr. 27, 1943 |
| 2,320,115 | Young | May 25, 1943 |
| 2,335,190 | Minich | Nov. 23, 1943 |
| 2,387,566 | Custers | Oct. 23, 1945 |
| 2,434,541 | Bierer | Jan. 13, 1948 |
| 2,442,443 | Swallow | June 1, 1948 |